United States Patent [19]

Wendland et al.

[11] Patent Number: 4,620,225
[45] Date of Patent: Oct. 28, 1986

[54] SYSTEM FOR TV TRANSMISSION

[75] Inventors: Broder Wendland, Waltrop; Dirk Uhlenkamp, Dortmund-Somborn, both of Fed. Rep. of Germany

[73] Assignee: Robert Bosch GmbH, Stuttgart, Fed. Rep. of Germany

[21] Appl. No.: 530,073

[22] Filed: Sep. 7, 1983

[30] Foreign Application Priority Data

Sep. 13, 1982 [DE] Fed. Rep. of Germany ....... 3233882

[51] Int. Cl.$^4$ .............................................. H04N 7/04
[52] U.S. Cl. ................................... 358/141; 358/105; 358/12; 358/137; 358/160
[58] Field of Search .................. 358/11, 83, 105, 141, 358/160, 186, 137, 140, 260, 12

[56] References Cited

U.S. PATENT DOCUMENTS 4,090,221 5/1978 Connor ............................... 358/105

Primary Examiner—James J. Groody
Assistant Examiner—Michael D. Parker
Attorney, Agent, or Firm—Michael J. Striker

[57] ABSTRACT

A TV transmission system having an increased picture quality. Depending on whether the picture to be transmitted is a still picture or a motion picture, the TV signals are derived either from the scanning of the scene or by interpolation from consecutive scanning lines. The scanning at the transmission side is performed at a higher number than the standard number of picture lines of the system.

8 Claims, 9 Drawing Figures

SYSTEM FOR TV TRANSMISSION

BACKGROUND OF THE INVENTION

The present invention relates in general to a television system, and in particular to a TV transmission system having an improved picture reproduction quality.

In German publication "Fernseh- und Kinotechnik", 1980, Nr. 2, pp. 41–48, different TV systems have been described in which the reproduction quality and other quality parameters of reproduced pictures have been improved in comparison with conventional systems. If such proposed systems are to be introduced to actual TV broadcasting, the question of compatibility with present systems must be taken into account. That is, the transmissions performed according to the new methods must be capable of being received by existing TV receivers without any quality losses. To this end, in the aforementioned article, several methods are discussed which, however, have not found any application on a broad basis.

SUMMARY OF THE INVENTION

A general object of the present invention is to provide a TV system which has an increased picture quality and which ensures a full compatibility with TV systems presently in use.

An additional object of the invention is to provide such an improved TV transmission system which requires only moderate technical expenditures for its realization.

In keeping with these objects and others which will become apparent hereafter, one feature of the invention resides, in a TV system designed for transmission of video signals in a bandwidth corresponding to a first scanning line frequency, in the provision of means for scanning an optical scene at a second scanning line frequency, without line jumps within a half frame of the scanned image, the second scanning line frequency being larger than the first scanning line frequency, means for detecting motion in the optical scene so as to produce an output signal indicative of the presence or absence of motion, and means responsive to the output of the detecting means and cooperating with the scanning means for deleting in the presence of motion the scanning lines pertaining to a half frame, and in the absence of motion extracting the scanning lines pertaining to both half frames.

The system of this invention has the advantage that, even when using conventional receiving sets, an improvement in the reproduction quality will occur. Another advantage of this invention results from the fact that, in using receiving apparatuses which are matched to the new system, the transmission channel employed for conventional systems of this kind is utilized in a particularly advantageous manner so as to produce TV pictures of a substantially improved resolution quality.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 4a is a block circuit diagram of a series-parallel converter in the arrangement of FIG. 1;

FIG. 4b is a time plot of signals in the converter of FIG. 4a;

DESCRIPTION OF THE PREFERRED EMBODIMENTS

Figure 1:
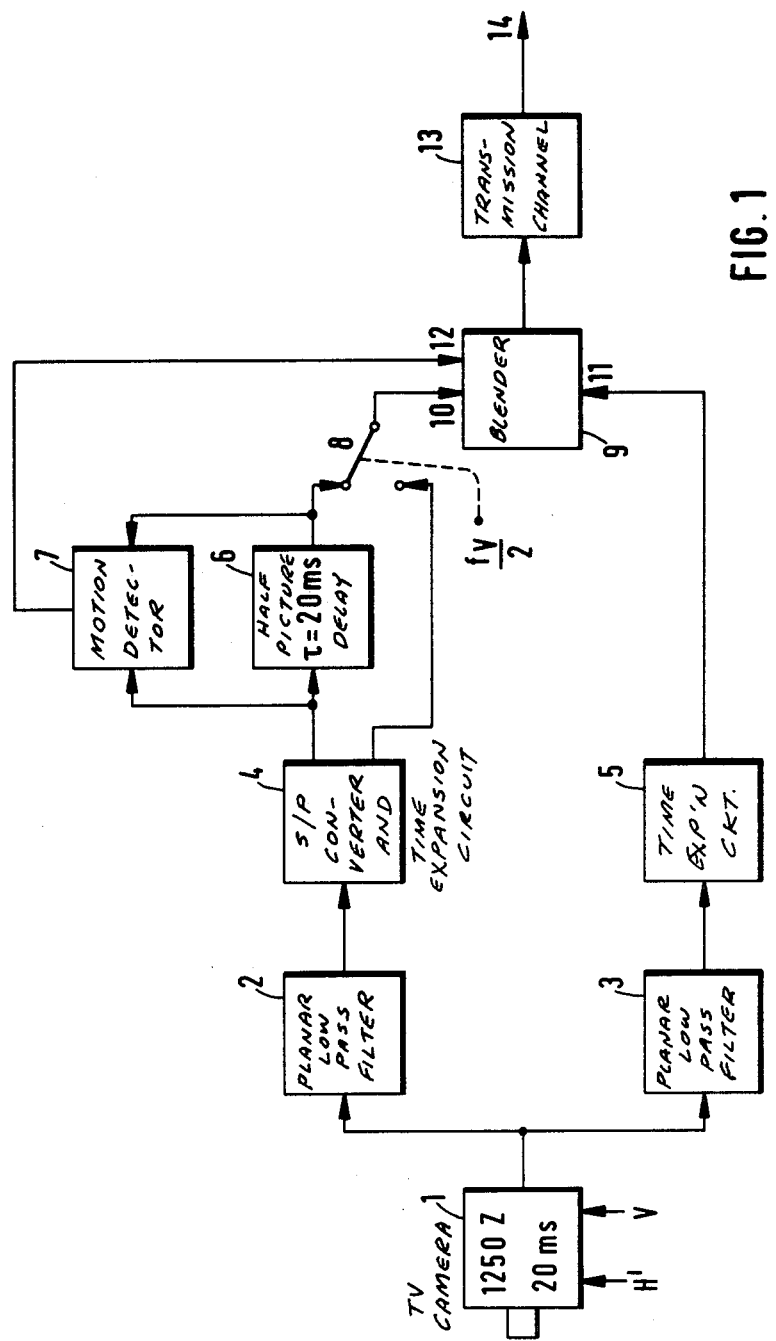
FIG. 1 is a schematic block diagram of a first embodiment of a pick-up device in the system of this invention.

The exemplary embodiments illustrated in the drawing refer to a TV transmission system according to this invention which is adjusted to a 625-line system. Hence, the indicated line numbers as well as picture and scanning line frequencies are not valid for matching the system of this invention to other systems, such as for example the U.S. 525-line system.

Referring firstly to FIG. 1, TV camera 1 takes 1,250-line pictures to be transmitted. This line number is scanned within 20 milliseconds, and therefore the time period of a half frame is scanned according to a 625-line standard. Corresponding vertical and horizontal pulses V and H' are applied to the camera. The frequency of pulses H' corresponds to a quadruple of frequency $f_H$ of the 625-line system. Due to the quadrupling of the line frequency, it is achieved that the new line frequency is an integer multiple of the vertical frequency $f_V = 50$ Hz, whereby scanning without intermediate lines is achieved.

Output signal from camera 1 is applied to two planar lowpass filters 2 and 3. The two lowpass filters have the effect that the video signals are filtered in the line direction, in the vertical direction, as well as in the diagonal direction. Considering the image to be transmitted as a brightness value varying in vertical direction, then by scanning the image in discrete lines a perfect transmission of this brightness pattern can be accomplished only when this kind of scanning fulfills the Nyquist Theorem, that is the scanning frequency is to be larger than the highest frequency containing the signal to be transmitted. In scanning arbitrary optical subjects, that is arbitrary pictures and scenes, by the nature of this operation it cannot be prevented that in vertical direction sharp jumps in brightness or periodic picture element structures will occur which have higher frequency than a half of that assumed for the line-by-line scanning.

In connection with a conversion of 1,250-line signals into standard 625-line signals, as will be explained below, a substantial improvement of the latter disadvantage of conventional receiving systems can be achieved in such a manner that video signals generated by scanning at an increased line frequency are lowpass filtered to such an extent that for the subsequent 625-line system the scanning (Nyquist) theorem is fulfilled. In this manner the so-called alias interferences are substantially eliminated.

Before discussing the signal processing in the following circuits, the following more general explanations are to be considered. According to the invention it makes a difference in transmitting video signals whether motion is present in the picture or whether substantially still scenes are processed. As will be explained in detail below, output signals from camera 1 are processed in various ways. Depending on the presence of a motion of the scanned subject, a blender 9 is controlled by applying a signal corresponding to still images to an input 10 whereas the other input of the blender is provided for receiving moving scenes. The output of the blender is connected to a transmission channel 13 which includes all components which are necessary for transmission of video signals according to conventional existing TV systems. These conventional elements may include: picture-mixing devices, recording and reproducing apparatuses, cable transmission tracks, TV transmitters, TV antenna installations, party or block antenna installations and also the high-frequency and demodulation part of a television receiver. In connection with the present invention, the transmission channel 13 is substantially characterized by existing standard parameters such as line number, picture frequency, bandwidth and the like. Reference numeral 14 in FIG. 1 denotes the output of transmission channel 13 which is connected to the input of the circuit arrangement according to FIG. 5.

Figure 2:
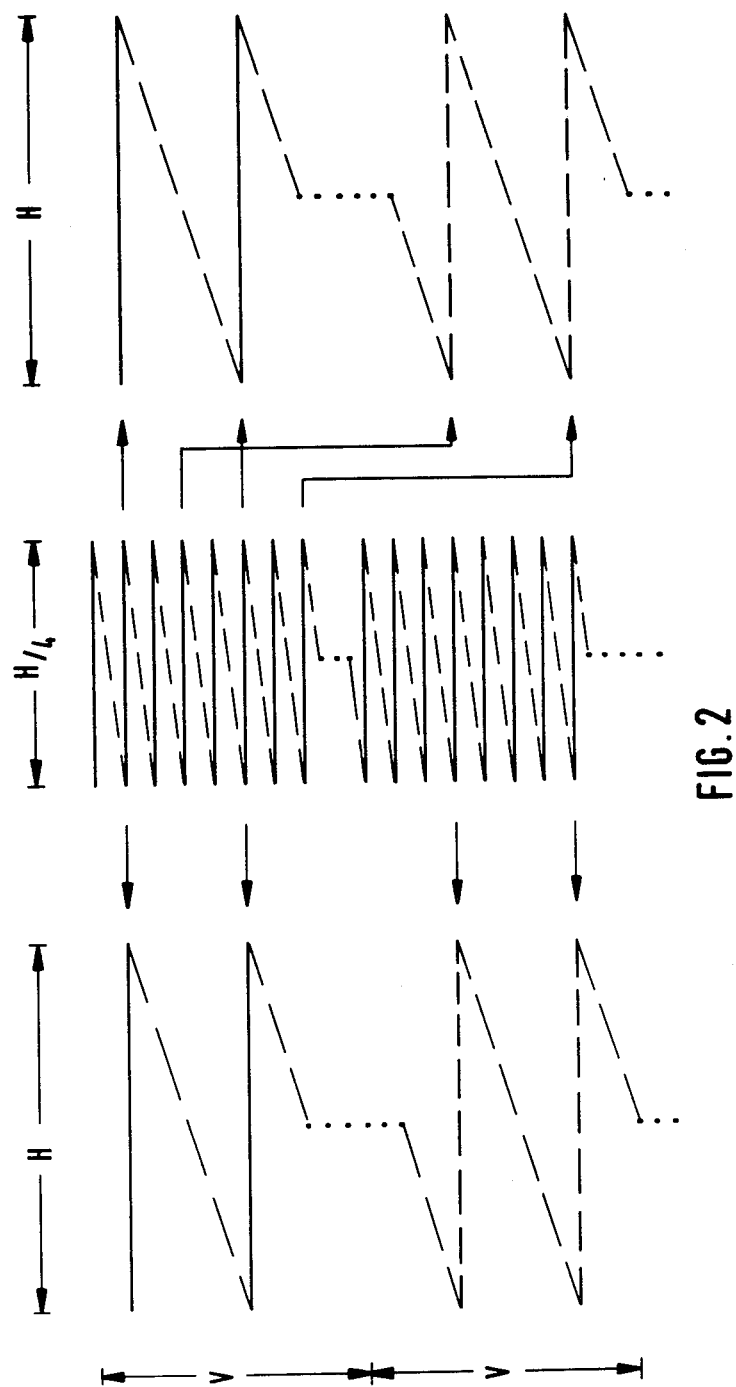
FIG. 2 is a time plot of signals processed in the device of FIG. 1.
Figure 4:
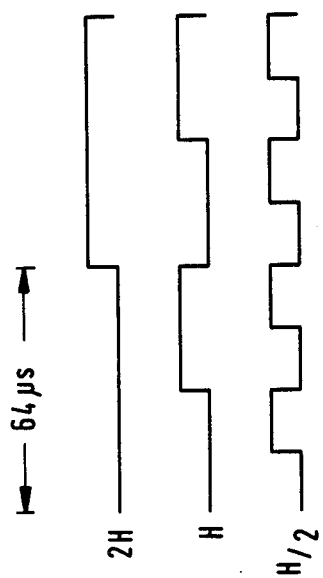
Figure 4:
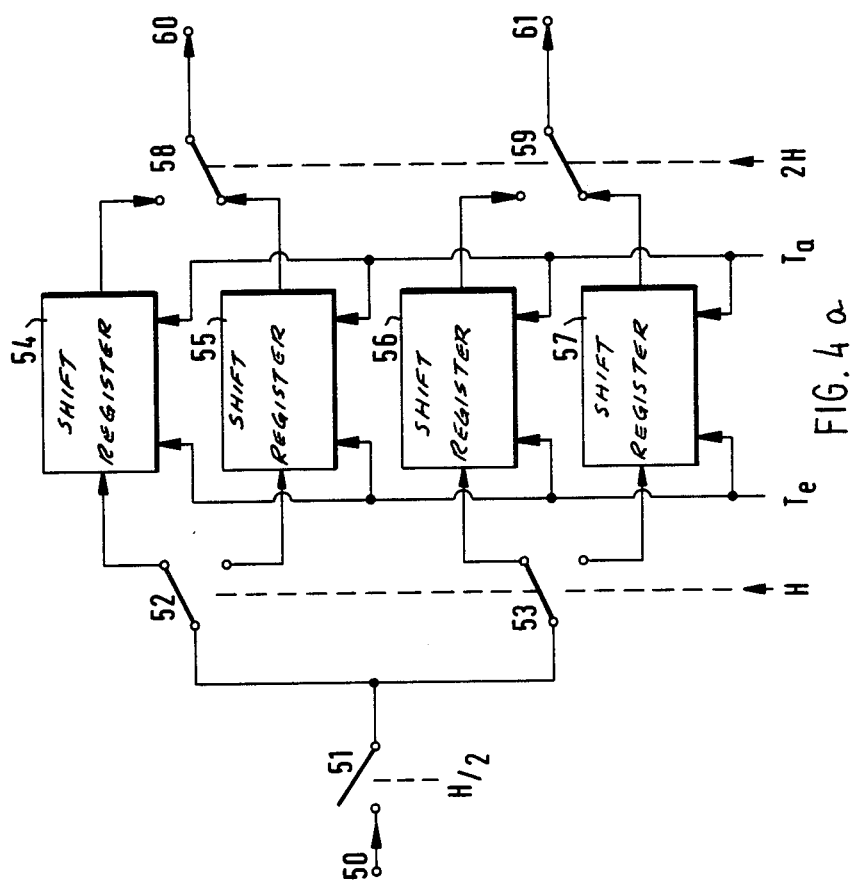

The following description will be limited to the case of a still picture or a motionless subject. Output signals from the planar lowpass filter 2 have as before a picture period of 20 milliseconds and a line number of 1,250; nevertheless the vertical resolution is limited to 625 lines. In the subsequent series-parallel converter (described in FIG. 4), there is retrieved from the output signals of the planar lowpass filter each fourth line for the first half picture to be transmitted and expanded or stretched by a factor of 4. Time diagrams of these processes are schematically illustrated in FIG. 2. The central part of FIG. 2 shows the scanning pattern of camera 1 whereby the line deflection in horizontal direction and the picture deflection in vertical direction correspond to those as seen on a picture screen. No picture backsweep, however, are considered so that in perpendicular direction the individual picture frames are continuously illustrated one after the other, that is no time axis is present in vertical direction. The right-hand part in FIG. 2 shows the time plot of signals to be transmitted for still picture subjects, and the left-hand part shows signals to be transmitted in the case of moving subjects. It will be seen that, of the 1,250 lines schematically illustrated in the central part of FIG. 2, each fourth line, as mentioned before, is extended in time by a factor of four, to be used for transmission of the first half picture according to the standard of conventional systems. In order to transmit the second half picture (illustrated in dashed lines), there are retrieved from the full picture taken by camera 1 the lines which are present between the two lines which have been already utilized for the first half frame.

The retrieval of signals illustrated in the right-hand part of FIG. 2 is accomplished by functional units 4, 6, 7 and 8 in FIG. 1. As mentioned before, in the serial/parallel (S/P) converter 4, which at the same time includes a circuit for a time expansion, the scan lines which in the camera output signal are only 16 milliseconds long are time-expanded by a factor of 4 before each second line has been deleted. The (S/P) converting circuit 4 has two outputs at which both the lines for the first half picture and the lines for the second half picture simultaneously occur. Scanning lines derived for the second half picture are delayed by means of a digital half picture store by a time interval of 20 milliseconds and are applied to the upper contact of a switch 8, whereas scan lines derived for the first half picture are directly connected to the other contact of the switch 8. The movable contact of switch 8 is connected to the input 10 of a blender 9. Switch 8 is controlled by rectangular pulses of a control voltage in such a manner that it remains in one of its switching positions for a period of one half picture. The pulse rate or frequency of the rectangular control voltage in the case of a 625-line system is 25 Hz. The details of FIGS. 1 and 2 will be further explained in connection with FIGS. 3 and 4. The half frame or half picture store 6 is well known from the art and need not be explained in detail for understanding this invention.

To determine whether a motion is present in the scene to be transmitted, a so-called motion detector 7 produces a motion output signal from two consecutive pictures taken by the camera. The motion detectors of this kind are also well known in the art and need not be described in detail in context with this invention. It will only be noted that the simplest embodiment of a motion detector is a substraction circuit which produces a difference between two consecutive pictures and cooperates with a subsequent lowpass filter so as to produce from a video signal a control voltage. It is also necessary to use a circuit for generation of a sign-independent value, inasmuch as in the application of a motion detector for this invention it is irrelevant in which direction a scene changes.

In the presence of motion in the scene to be transmitted, the signal at the input 10 of blender 9 is blended and mixed with the signal at the input 11, whereby the degree of blending depends on the speed of the detected motion in the picture. A minute motion can be neglected and the scene can be evaluated as a still picture. When transmitting signals from the camera through the aforedescribed upper branch (elements 2, 4, 6) a flickering reproduction of fast-moving pictures might result. To avoid this disadvantage, the output signal from camera 1 is fed through the lower branch containing another planar lowpass filter 3 and a time expansion circuit 5. This circuit 5 stretches the contents of each fourth line of the output signal from the camera 1 by a factor of four, whereby the three intermediate lines are suppressed. By selecting the ratio of the line numbers, it is achieved that the lines in the first half picture signal to be transmitted is derived from the first scanning pattern of the camera, whereas the lines of the second half picture are derived from the second scanning pattern from the camera. Since in the case of a fast motion the second scanning pattern contains a distinctly different phase of the motion, the second half picture signals to be transmitted are considered, as regards the motion, as if they were generated directly in a second scanning process. The so-called motion resolution in the transmission of the signals through the lower branch (elements 3, 5) in the arrangement of FIG. 1 is twice as large as that obtained in transmitting the signals through the upper branch.

As has already been mentioned, the arrangement of this invention makes the resulting signals fully compatible with those of the existing TV systems, that is they can be transmitted and received by conventional apparatuses. When the signals are received or reproduced by existing television receivers, an advantage is achieved in that brightness changes in vertical direction, which may have a higher local frequency than the half of the line pattern of a conventional TV system, do not produce any alias interferences.

Figure 3:
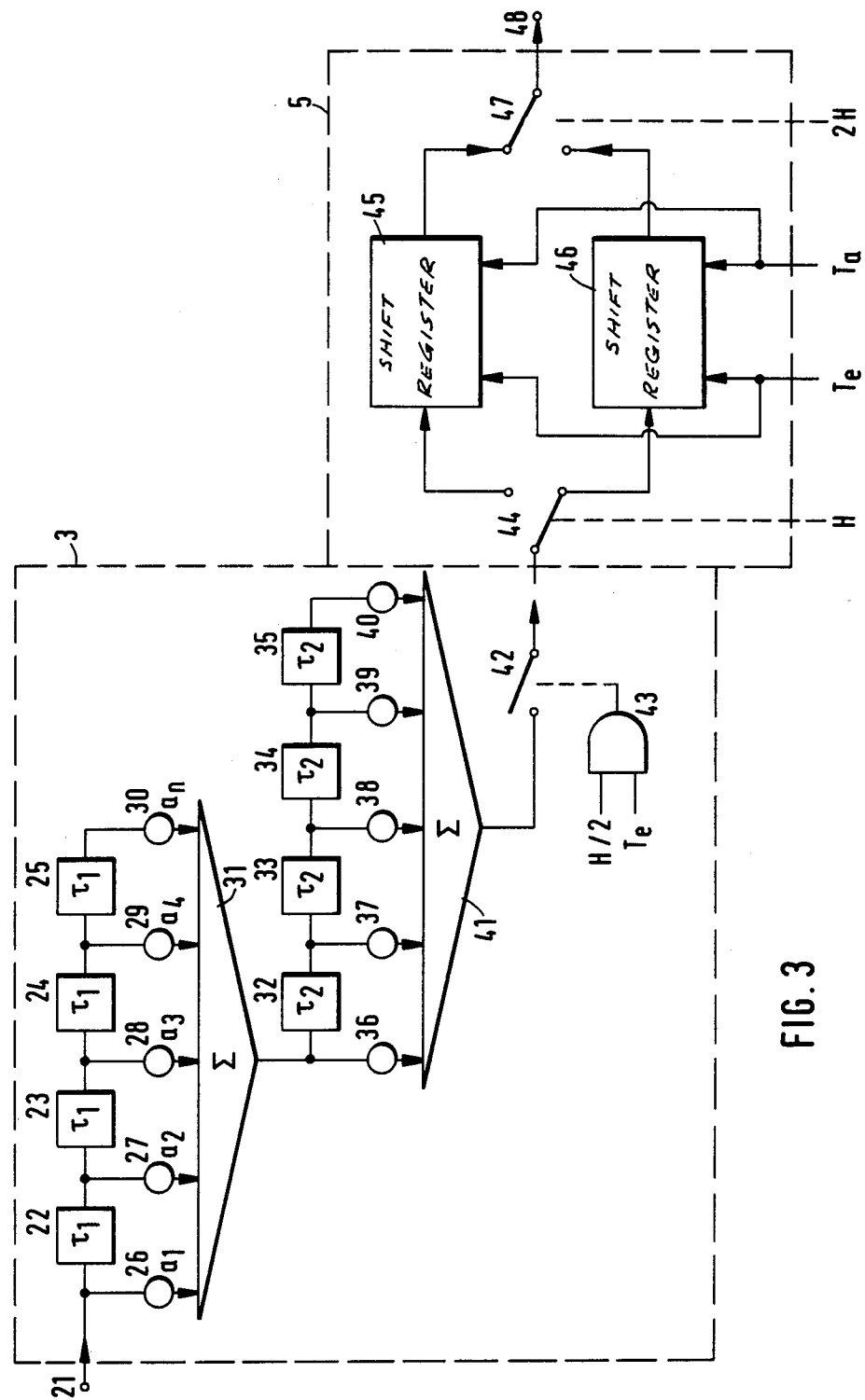
FIG. 3 is a more detailed circuit diagram of the device of FIG. 1.

For a further explanation of the arrangement of FIG. 1, reference is made to FIG. 3, showing in detail functional groups 3 and 5 of the arrangement of FIG. 1. The planar lowpass filter 3 has two stages, of which each consists of a series of delaying circuits cooperating with evaluation circuits and with a summing circuit. It will be noted that these circuits are well known in the art and can be either in the form of analog or digital devices. In the preferred embodiment, however, digital devices are used to facilitate the storing of processed data. The output signal from camera 1 is applied to input 21 of the planar lowpass filter 3. In the lowpass filter the signal is four times delayed by a time period $\tau_1$ in the consecutive delaying stages 22, 23, 24 and 25. The time delay $\tau_1$ amounts for example to a line period plus the duration of a picture point. A non-delayed portion of the input signal as well as the corresponding consecutive time-delayed signal portions delayed from time period $\tau_1$ to a multiple of $\tau_1$ are weighted or evaluated by coefficients $a_1$ to $a_n$. To this end, there are provided circuits 26–30 each having a different transfer factor. The evaluation or weighting sectors determine the course of the characteristic line of the lowpass filter. The evaluated signals are added one to another in a summing or adding circuit 31.

The first stage of the planar filter 3 filters the video signals in one direction, in this case in the diagonal direction. A similar arrangement of time-delaying stages 32, 33, 34 and 35 and of weighting circuits 36–40 with different transfer factors as well as summing circuit 41 provides for filtering in another direction. The delaying stages 32–35 delay the processed signal by time periods $\tau_2$ corresponding to a line period less the duration of the picture point. Since in the filter 3 the video signals are lowpass filtered to such an extent that a high scanning frequency, that is in vertical direction a high number of scanning lines, are no longer needed, a reduction of clock time in line direction results. By means of switch 42, a reduced number of lines is also obtained. Control voltage for the switch 42 is generated by an AND-gate from the scanning frequency $T_e$ and of a meander of doubled line frequency H/2. In this manner, each second line and each second picture point are suppressed.

Video signals filtered in the aforedescribed manner now reach the switch 44 and are line-by-line alternately written into the shift registers 45 and 46. This write-in operation is in synchronism with a relatively fast clock signal $T_e$. The reading from the shift registers 45 and 46, on the other hand, is performed in synchronism with a clock $T_a$ which is four times slower than the clock $T_e$, and consequently the retrieved lines are four times time-expanded. The arrangement of two shift registers enables that while signals are written into one register the output signals can be read out simultaneously from the other shift register. Switch 47 is controlled in such a manner that the output of the shift register which is in the reading mode of operation is connected to the output 48 of the expansion circuit 5. The switch 44 at the input of the shift registers is controlled by a meander-like voltage at a line frequency. The control of the output switch 47 is performed also by means of a meander-like voltage, whose frequency however corresponds to half the line frequency.

Regarding the control of the switches 44 and 47, it will also be mentioned that in the TV technology the reference character H indicates not only the H-pulses but also the corresponding time period of for example 64 microseconds. Accordingly, 2H indicates a control signal half the line frequency, whereas a signal H/2 denotes a double line frequency.

FIG. 4a shows in more detail a block circuit diagram of the serial/parallel converters 4 in the arrangement of FIG. 1. The planar filtered signals are fed in at the terminal 50. A switch 51 controlled by a meander-like voltage of a doubled line frequency suppresses each second line of the incoming 1,250-line signal. The modified signal is fed via switches 52 and 53 to the inputs of shift registers 54, 55 and 56, 57. The switches 52 and 53 are controlled by meander-like control voltages 2H, H and H/2 whose time plots are depicted in FIG. 4b.

Line signals passed through the switch 51 are again controlled by the switches 52 and 53, so that each second line signal reaches the shift registers 54 and 56 and the remaining lines reach the shift registers 55 and 57. The line signals are into the shift register at a fast clock rate $T_e$. The duration of a period of this clock corresponds to the duration of a picture point at the receiving scanning pattern. The contents of the shift registers are read out at a four-times slower clock rate $T_a$, so that the lines at the output of the shift registers in a four-times expanded form are fed through switches 58 and 59 to outputs 60 and 61. The switches 58 and 59 are controlled at a rate corresponding to half the line frequency, so that the switches 58 and 59 remain in respective upper or lower switching positions for a time interval corresponding to a line period. As a result, lines provided for the first half picture are applied to the output 61 and the lines produced for the second half picture simultaneously occur at the other output 60.

Figure 5:
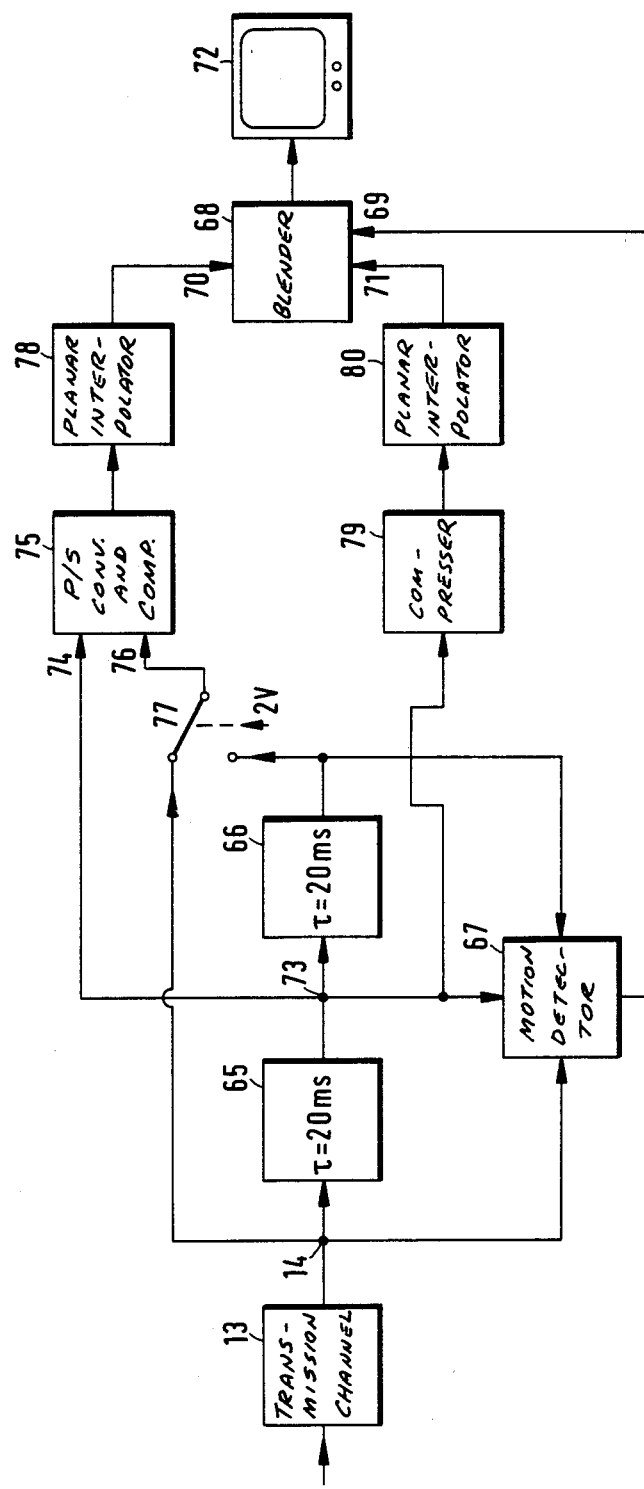
FIG. 5 is a block circuit diagram of a receiving or reproducing device in the system of this invention.
Figure 6:
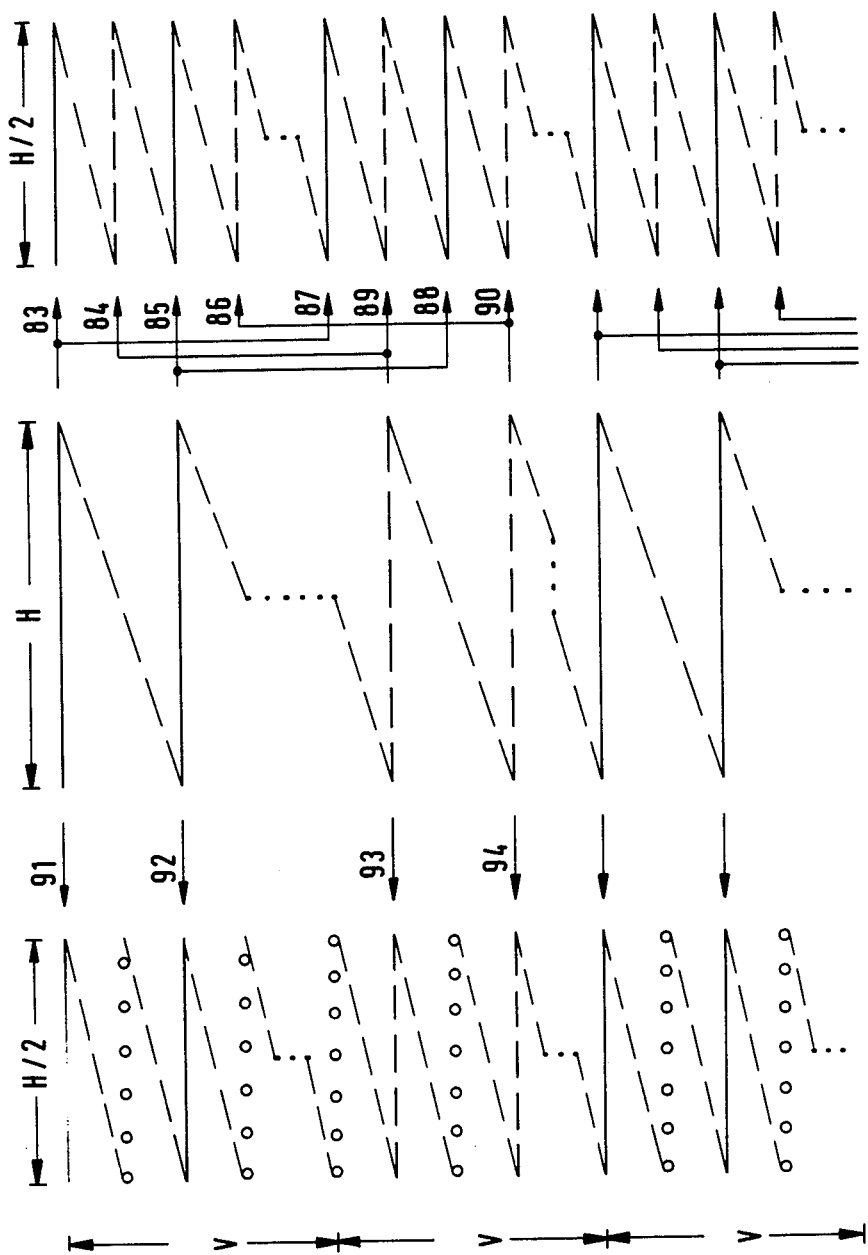
FIGS. 6 and 7 illustrate time plots of signals processed in the device of FIG. 5.

FIG. 5 shows an arrangement for reproduction of signals transmitted in the system according to this invention, whereas FIG. 6 schematically illustrates the scanning pattern or frame of the signals produced in the arrangement of FIG. 5. The 625-line signal is applied through the transfer channel 13 (FIG. 1) to the input 14 in the arrangement of FIG. 5. Circuit blocks 65 and 66 represent each a picture memory employed as a time-delaying device. The delay time amounts to a half picture period, that is 20 milliseconds. The non-delayed signal, the signal delayed by a half picture period, and the signal delayed by two half picture periods are applied to a motion detector 67 whose output controls a signal blender and mixer 68. Depending on the magnitude of the control voltage applied to the control input 69 of the blender 68, the signals from the other inputs 70 and 71 of the blender are applied either directly to the blender output or blended together into an intermediate sum of these signals. The output of blender 68 is connected to a TV picture reproducing apparatus 72, which apart from the picture tube includes also all conventional circuits for controlling the picture tube. The picture-reproducing apparatus 72 corresponds in principle to conventional TV receivers, but in view of the desired higher quality of reproduction, they are adjusted to improved TV broadcasting systems, especially by providing a higher deflection speed and a larger bandwidth of its video channels. The scanning pattern of the picture-reproducing device 72 includes 625 lines produced within 20 milliseconds. Similarly as in known TV systems, the number of lines visible on the picture screen is lower than the transmitted number, inasmuch as a part of the lines is used for the flyback at the vertical frequency.

In the case of still subjects or picture scenes, or at low motion speeds, the blender 68 is controlled by motion detector 67 in such a way that the signals from input 70 are passed to the blender output. The upper branch of the circuit of FIG. 5 serves for the transfer of signals corresponding to still or very slowly moving pictures. In this upper branch, signals from connection point 73, which are time-delayed about a half picture period, are applied to a first input 74 of a parallel/serial converter 75 which also acts as a time compressor. The other input 76 of the converting and compressing circuit 75 is supplied alternately at a half picture frequency with non-delayed signals and with signals delayed by two half picture periods. To this end, a switch 77 is controlled by a meander-like control voltage 2 V at half the vertical frequency. The converting and compressing circuit 75 operates similarly as the converter 4 in FIG. 1, except that it has a reverse function. The operation of the arrangement of FIG. 5 will be explained with reference to time diagrams in FIG. 6. The central diagram of FIG. 6 illustrates schematically the shape of transmitted 625-line signals. For the sake of clarity, similarly as in FIG. 2, a time axis extending perpendicularly to the line direction is used.

The right-hand diagram in FIG. 6 represents a full picture scanning line pattern produced in the case of slow motion pictures or in transmission of still picture scenes, whereas the left-hand diagram represents the scanning line pattern produced at larger speeds of the TV picture.

Referring firstly to the right-hand diagram in FIG. 6, the function of the circuit block 75 will be explained. The first line in the reproduced line pattern is indicated by arrow 83 and is derived by compressing in time the first line from the scanning pattern of transmitted signals. The second line (arrow 84) is derived by compressing the first line of the second half picture. The latter line, however, in transmitting still pictures (FIG. 1) is derived from the first full picture line pattern of signals from the camera 1, by delaying these signals by a half picture period. The arrangement according to FIG. 5 therefore has only returned to its proper place. Since this line has been derived from a trailing half picture of transmitted signals, the switch 77 (FIG. 5) during the first half picture is in its upper position. A similar process is repeated for the subsequent lines of the first partial picture to be repeated; in particular, the third line is gained from the second line of the first transmitted half picture (arrow 85), whereas the fourth line is derived from the second line of the second half picture (arrow 86).

The second half picture of the signals to be reproduced is derived in such a manner that the oddlines indicated by full lines in FIG. 6 are gained from the first half picture of the transmitted signals by compression and time delay by a half picture period (arrows 87 and 88), whereas the even lines indicated by dashed lines are gained only by compression of the simultaneously produced signals of the second half picture (arrows 89, 90). During the second half picture when the switch 77 (FIG. 5) is therefore in its lower switching position. In the third half picture, these processes are repeated in accordance with those pertaining to the first half picture.

In the presence of motion, as will be seen from FIG. 6, the signals to be reproduced are gained by line-by-line compression by the factor two of transmitted signals. This process is indicated by arrow 91–94 in FIG. 6. However, in the presence of motion, the even lines are obtained by interpolation of two consecutive odd lines. Consequently, in presence of fast motions, the the picture definition is reduced but no flickering reproduction of the moving pictures will occur.

Figure 7:
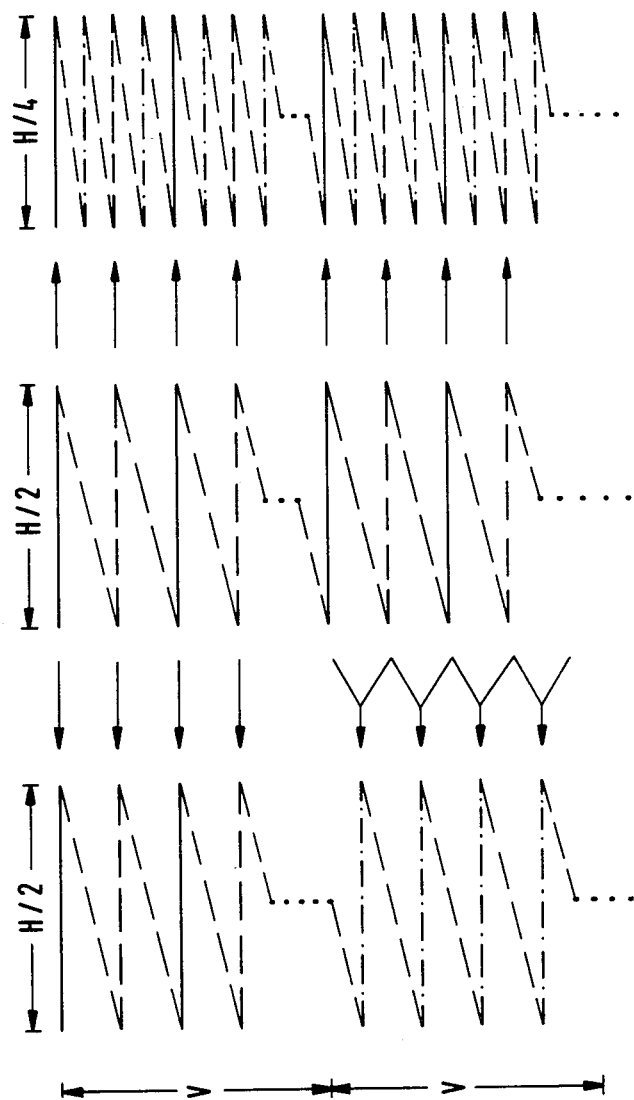

The planar interpolator 78 (FIG. 5) serves for deriving additional lines, as will be explained below in connection with FIG. 7. When producing signals in the presence of motion in the scanned scene, as illustrated in FIG. 6, the planar interpolator 80 serves for the generation of lines depicted in the left-hand diagram in FIG. 6 by rows of little rings. The interpolators are known from prior art and need not be described in detail for using this invention.

When describing FIG. 6, it is assumed that in the picture-reproducing device 72 (FIG. 5) a continuous scanning pattern with 625 lines is written within each 20 milliseconds. This feature also improves the quality of the reproduced picture. Depending on the quality of the picture-reproducing cathode ray tube, a line structure is still recognizable by the viewer. However, horizontal edges of the picture do not display any flicker, since due to the high number of scanning lines and due to corresponding filtering, the scanning theorem has been fulfilled. Also, the line flicker and the line travel is substantially suppressed by the combined action of the large number of lines in connection with the vertical modulation transfer function of the monitor. The line period is half the length of that in the conventional 625-line systems, whereas in camera 1 (FIG. 1) the line period amounts to a quarter of conventional line periods. The bandwidth of analog video signals in comparison is half of that of the proposed scanning at the receiver. It is also possible, however, to employ the same scanning pattern during the reproduction of signals transferred in accordance with this invention as in the camera 1 (FIG. 1). In doing so, the interfering phenomena such as line flicker and line travel are still more effectively prevented. These two possibilities are compared in the time plots of FIG. 7, illustrating in the central diagram the output signals from the compression unit 79 (FIG. 5), in the left-hand diagram the reproduction using line jump method, and in the right-hand diagram the picture reproduction with increased number of lines. When reproducing by means of the line jump the signals produced according to diagram in the center of FIG. 6 are taken over without change during the first partial picture, whereas during the second partial pictures two consecutive lines are interpolated. If, however, all 1,250 lines are written within the time interval of a half picture by means of the picture-reproducing device as indicated in the right-hand diagram of FIG. 7, then it is necessary to reproduce each second line (dashed lines) by interpolation. For this purpose the aforementioned planar interpolator 78 is provided (FIG. 5).

Figure 8:
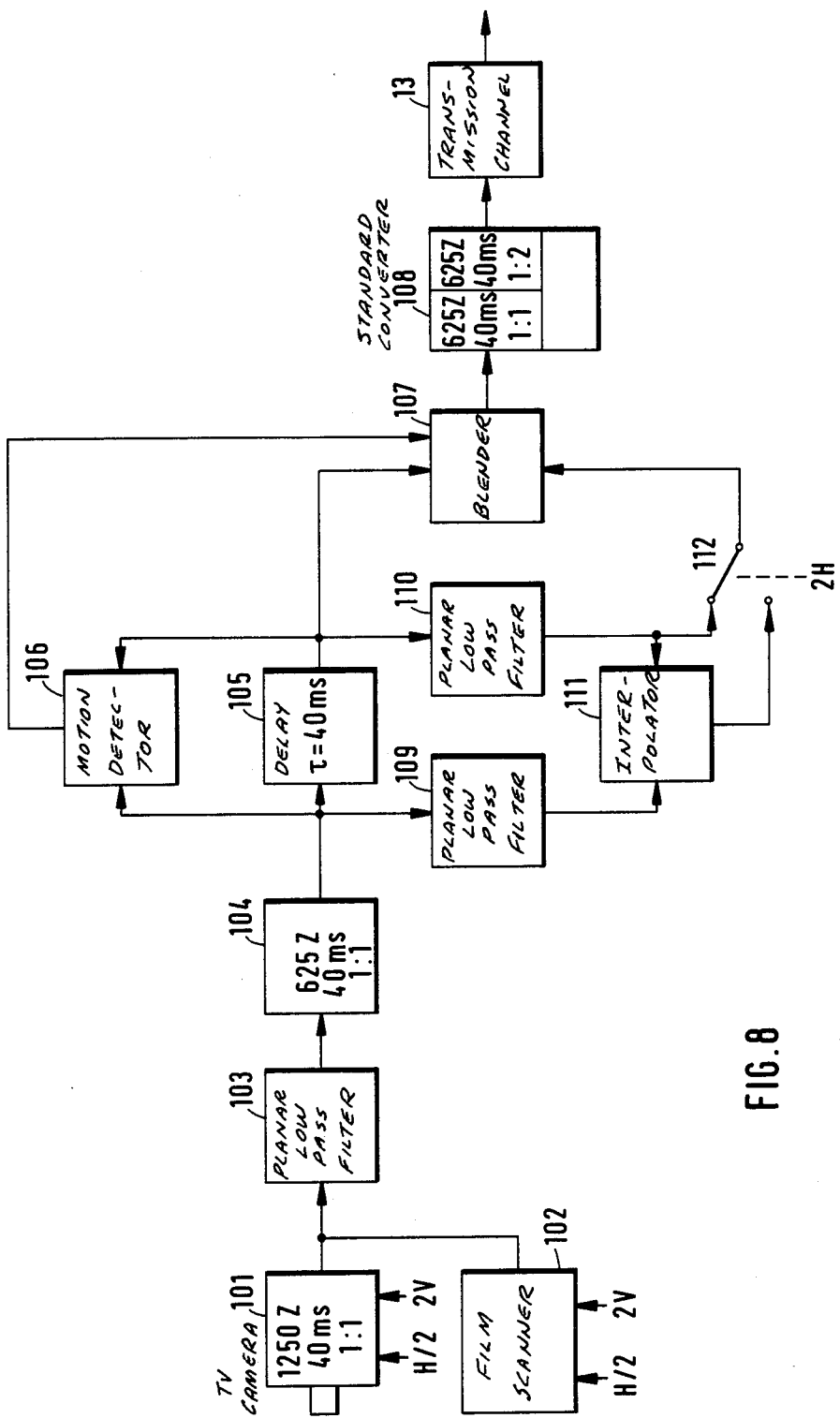
FIG. 8 is a block diagram of another embodiment of the pick-up device in the system of this invention.

FIG. 8 depicts an example of another embodiment of the system of this invention at the picture-taking side. In this example, a TV camera 101 is operated in such a manner that the scene is scanned at 1,250 consecutive lines during a full picture period of 40 milliseconds. To this end, horizontal pulses H/2 at double line frequency, and vertical pulses 2 V of half vertical frequency, are applied to the camera. The indication 1:1 denotes that no line jump is present. Instead of the camera, a film scanner 102 can be operated in the same manner, inasmuch as the arrangement according to FIG. 8 is suitable particularly for improving the quality of motion resolution in the film scanner. Similarly as in the arrangement of FIG. 1, a planar lowpass filter 103 is connected to the output of the camera 101 and its output signal is fed to a time expansion unit 104 where each second line is suppressed and the remaining lines are time expanded to a double duration. As a result, a scanning pattern is produced in which 625 lines are written within 40 milliseconds without any line jumps. These signals are delayed by 40 milliseconds in a picture store 105. The input and the output of picture store 105 are compared with each other in a motion detector 106 whose output controls a blender 107. Provided that no motion is detected, the output signals from the picture store 105 are applied to a standard converter 108. This standard converter also includes a picture store. The writing into and the reading out from the converter 108 are accomplished in such a manner that odd lines of the input signals are consecutively read out as the first half picture, and thereafter the even lines of the input signals are read out as the second half picture. The standard converters of this kind are known from the art of film scanners. For instance, a standard converter of this kind is described in German patent application No. P 26 32 378. The transfer or transmission channel 13 is connected to the output of the standard converter 108.

In the case when motion in the scene is detected, then by means of the planar lowpass filters 109 and 110 a further half picture is prepared from the non-delayed and delayed signals at the input and output of store 105. A switch 112 controlled by control signal at half the line frequency passes to the blender 107 first one line of the original half picture and then one line of the half picture produced by interpolation.

It will be understood that each of the elements described above, or two or more together, may also find a useful application in other types of constructions differing from the types described above.

While the invention has been illustrated and described as embodied in a transmission system for use with black-and-white television, it is not intended to be limited to the details shown, since various modifications and structural changes may be made without departing in any way from the spirit of the present invention. For example, the system of this invention is applicable in the same manner in a color TV transmission system. Moreover, the application of this invention is not limited to the described 625-line systems, but the specific examples are easily made applicable to systems employing different line numbers.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A system for TV transmission of pictures assembled of a first number of scanning lines, comprising pick-up means for scanning optical scenes to be transmitted, said pickup means generating a scanned signal corresponding to a series of half pictures each assembled of a second number of scanning lines that is four times higher than said first number and being scanned without scanning line jumps in a half picture;

means for branching said scanned signal into two signal processing units;

one of said signal processing units including serial/-parallel converting means for retrieving from said signal every other line and time expanding the retrieved lines by a factor of four to produce first and second parallel signals corresponding to first and second half pictures each assembled of said first number of scanning lines;

the other of said signal processing units including means for retrieving from said signal each forth line and suppressing the intermediate lines and time expanding the retrieved lines of said other signal processing unit by a factor of four to produce a third signal corresponding to said first half picture assembled of said first number of scanning lines;

motion detecting means for producing a control signal when a motion component is detected in said first parallel signal;

means for delaying said first parallel signal for a scanning period of one half picture;

a blending unit controlled by said control signal to mix alternately the delayed first parallel signal from said delaying means and the non-delayed second parallel signal from said time expanding means in said one signal processing unit with the third signal from said other signal processing unit to produce an output signal corresponding to a series of first and second half pictures assembled of said first number of scanning lines and having an increased motion resolution.

2. A system as defined in claim 1 wherein said pick-up means includes a TV camera, at least one planar lowpass filter in each of said signal processing units, each lowpass filter being connected between said TV camera and the retrieving means in respective signal processing units to eliminate alias interferances from the scanned signal.

3. A system for TV transmission of pictures assembled of a first number of scanning lines, comprising pick-up means for scanning optical scenes to be transmitted, said pick-up means generating a scanned signal corresponding to a series of pictures each assembled of a second number of scanning lines that is four times higher than said first number;

means for suppressing in said scanned signal each second line and time expanding the remaining lines to a double duration to produce a first signal corresponding to a picture assembled of said first number of scanning lines; means for delaying said first signal;

motion detecting means for producing a control signal when a motion component is detected in said first signal;

interpolating means for preparing half picture signals from the non-delayed and delayed first signal;

a blending unit controlled by said control signal to mix alternately the lines of an original half picture and the lines of the half picture obtained by interpolation with the delayed first signal after it has been passed through a planar low pass filter to produce an output signal; and means for converting said output signal into a modified output signal corresponding to a series of half pictures assembled of said first number of scanning lines and having an increased motion resolution.

4. A system as defined in claim 3 comprising a plurality of planar lowpass filters connected, respectively, between said pick-up means and said suppressing means, between an input of said delaying means and an input of said interpolating means, and between an output of said delaying means and another input of said interpolating means.

5. A system as defined in claim 2 wherein said blending unit includes means for periodically switching between said delayed first parallel signal and the non-delayed second parallel signal.

6. A system as defined in claim 2 wherein in the absence of said control signal said delayed first parallel signal and said non-delayed second parallel signal are consecutively applied to a TV transmission channel.

7. A system as defined in claim 1 further comprising a TV transmission channel for transmitting said output signal from said blending unit.

8. A system as defined in claim 7 further comprising a signal receiving means connected to said TV transmission channel and including a picture reproduction device operating at a deflection speed matching said higher scanning line number, a blender having two signal inputs, a control input and an output connected to said picture reproducing device, two signal processing circuits connected to respective signal inputs of said blender, first and second time delaying units connected in series to said transmission channel to delay the incoming signals by a half picture period each, one of said signal processing circuits for processing still pictures including a parallel/serial converter and compressor connected in series with a planar half picture interpolator, and the other signal processing circuit for motion pictures including a compressor and another planar half picture interpolator;

means for periodically switching an input of said parallel/serial converter between said TV transmission channel and an output of said second delaying unit; a motion detector having a first input connected to said TV transmission channel, a second input connected to the output of said second delaying unit, a third input connected to a common point between said first and second delaying units and an output connected to the control input of said blender; and an input of said compressor in said other signal processing circuit and another input of said parallel/serial converter in said one signal processing circuit being connected to said common point.

* * * * *